United States Patent
Weistrand (10) Patent No.: US 12,260,507 B2
(45) Date of Patent: Mar. 25, 2025

(54) DATA AUGMENTATION

(71) Applicant: RaySearch Laboratories AB, Stockholm (SE)

(72) Inventor: Ola Weistrand, Huddinge (SE)

(73) Assignee: RaySearch Laboratories AB, Stockholm (SE)

( * ) Notice: Subject to any disclaimer, the term of this patent is extended or adjusted under 35 U.S.C. 154(b) by 691 days.

(21) Appl. No.: 17/415,776

(22) PCT Filed: Dec. 16, 2019

(86) PCT No.: PCT/EP2019/085274
§ 371 (c)(1),
(2) Date: Jun. 18, 2021

(87) PCT Pub. No.: WO2020/126993
PCT Pub. Date: Jun. 25, 2020

(65) Prior Publication Data
US 2022/0076069 A1    Mar. 10, 2022

(30) Foreign Application Priority Data
Dec. 20, 2018  (EP) .................................... 18214457

(51) Int. Cl.
*G06T 19/20* (2011.01)
*G06F 18/214* (2023.01)
*G06V 10/75* (2022.01)

(52) U.S. Cl.
CPC .......... *G06T 19/20* (2013.01); *G06F 18/2148* (2023.01); *G06V 10/7553* (2022.01); *G06T 2219/2021* (2013.01); *G06V 2201/03* (2022.01)

(58) Field of Classification Search
CPC ............. G06T 19/20; G06T 2219/2021; G06F 18/2148; G06V 10/7553; G06V 2201/03
See application file for complete search history.

(56) References Cited

U.S. PATENT DOCUMENTS

| 7,894,664 B2 * | 2/2011 | Kerwin | G06T 7/149 382/224 |
| 8,126,240 B2 * | 2/2012 | De Bruijne | G06T 7/0012 382/128 |

(Continued)

FOREIGN PATENT DOCUMENTS

WO    WO-2018/040099 A1    3/2018

OTHER PUBLICATIONS

A. Lanitis, P. D. Sozou, C. J. Taylor, T. E. Cootes and E. C. Di Mauro, "A general non-linear method for modelling shape and locating image objects," Proceedings of 13th International Conference on Pattern Recognition, Vienna, Austria, 1996, pp. 266-270 vol.4, doi: 10.1109/ICPR. 1996.547428. (Year: 1996).*

(Continued)

*Primary Examiner* — Xuemei G Chen
(74) *Attorney, Agent, or Firm* — Faegre Drinker Biddle Reath LLP (57) ABSTRACT

A method for generating data representing the volume of part of a body, the method comprising generating a point distribution model "PDM" based on an input dataset comprising data representing at least one surface of part of a body, the PDM defining a surface model dataset based on an average dataset and one or more weight-eigenvector pairs, generating a first surface model dataset based on the PDM by modifying at least one weight of the one or more weight-eigenvector pairs, wherein the first surface model dataset is different from the average dataset, and generating an output volume dataset based on the first surface model dataset and a first reference dataset, the first reference dataset comprising data representing the volume of a corresponding part of a body, the output volume dataset comprising data representing a deformed volume of the corresponding part of the body.

16 Claims, 4 Drawing Sheets

(56) References Cited

U.S. PATENT DOCUMENTS

| | | | | |
|---|---|---|---|---|
| 8,169,433 | B2* | 5/2012 | Wang | G06T 19/20 |
| | | | | 345/419 |
| 9,076,201 | B1* | 7/2015 | Negahdar | G06T 7/38 |
| 10,818,100 | B2* | 10/2020 | Younes | G06T 19/20 |
| 2003/0097219 | A1 | 5/2003 | O'Donnell et al. | |
| 2005/0278156 | A1* | 12/2005 | Fisher, III | G06T 13/40 |
| | | | | 703/2 |
| 2008/0249414 | A1* | 10/2008 | Yang | A61B 8/0883 |
| | | | | 600/445 |
| 2008/0310759 | A1* | 12/2008 | Liu | G06V 10/7557 |
| | | | | 382/294 |
| 2009/0195545 | A1* | 8/2009 | Debevec | G06T 13/40 |
| | | | | 345/473 |
| 2012/0155726 | A1* | 6/2012 | Li | A61B 3/1176 |
| | | | | 382/128 |
| 2012/0237117 | A1* | 9/2012 | Liu | G06V 40/161 |
| | | | | 382/197 |
| 2013/0223704 | A1* | 8/2013 | Lay | G06T 7/11 |
| | | | | 382/128 |
| 2013/0223753 | A1* | 8/2013 | Sornborger | G06V 10/42 |
| | | | | 382/254 |
| 2014/0029823 | A1* | 1/2014 | Birkbeck | G06T 7/149 |
| | | | | 382/131 |
| 2014/0314290 | A1* | 10/2014 | Dabbah | G06F 18/24323 |
| | | | | 382/131 |
| 2015/0170416 | A1* | 6/2015 | McGregor | G06T 19/20 |
| | | | | 345/420 |
| 2015/0213646 | A1* | 7/2015 | Ma | G06T 7/50 |
| | | | | 345/420 |
| 2015/0297916 | A1* | 10/2015 | Chen | G06T 7/13 |
| | | | | 600/1 |
| 2016/0224690 | A1* | 8/2016 | Lee | A61C 13/0004 |
| 2017/0071706 | A1* | 3/2017 | Lee | A61C 13/0004 |
| 2017/0249423 | A1* | 8/2017 | Wang | G06V 10/7557 |
| 2017/0270671 | A1* | 9/2017 | Garnavi | G06T 7/187 |
| 2018/0000441 | A1* | 1/2018 | Wang | G06V 10/755 |
| 2018/0181802 | A1 | 6/2018 | Chen et al. | |
| 2018/0338742 | A1* | 11/2018 | Singh | A61B 6/587 |
| 2019/0347802 | A1* | 11/2019 | Linguraru | G06T 7/12 |
| 2020/0134446 | A1* | 4/2020 | Soni | G06N 3/08 |
| 2020/0342684 | A1* | 10/2020 | Kinsella | G06T 7/344 |
| 2021/0012550 | A1* | 1/2021 | Orvalho | G06T 17/00 |
| 2021/0251516 | A1* | 8/2021 | Pai | A61B 5/1077 |
| 2022/0050996 | A1* | 2/2022 | Mutter | G06V 20/698 |
| 2022/0076069 | A1* | 3/2022 | Weistrand | G06V 10/7553 |
| 2022/0192617 | A1* | 6/2022 | Wang | G06T 7/136 |

OTHER PUBLICATIONS

Sedai, Suman et al., "Segmentation of Right Ventricle in Cardiac MR Images Using Shape Regression," Oct. 2, 2015, Springer International Publishing, pp. 1-8.

Kleesiek, Jens et al., "Deep MRI brain extraction: A 3D convolutional neural network for skull stripping," NeuroImage vol. 129 (Jan. 2016) pp. 460-469.

Whitmarsh, Tristan et al., "Reconstructing the 3D Shape and Bone Mineral Density Distribution of the Proximal Femur From Dual-Energy X-Ray Absorptiometry," IEEE Transactions on Medical Imaging, vol. 30, No. 12, Dec. 2011, pp. 2101-2114.

T. Vrtovec et al., "Automated Construction of 3D Statistical Shape Models," Image Analysis & Stereology, vol. 23, No. 2, Jun. 1, 2004, pp. 111-120.

E. Remme et al., "Parameter Distribution Models for Estimation of Population Based Left Ventricular Deformation Using Sparse Fiducial Markers," IEEE Transactions on Medical Imaging, vol. 24, No. 3, Mar. 31, 2005, pp. 381-388.

* cited by examiner

DATA AUGMENTATION

This application is the National Stage of International Application No. PCT/EP2019/085274, filed Dec. 16, 2019, and claims benefit of European Patent Application No. 18214457.6, filed Dec. 20, 2018, the entire contents of which are incorporated by reference herein.

FIELD

The present disclosure relates to data augmentation. In particular, the disclosure relates to generation of datasets representing body parts.

BACKGROUND

Computational models of body parts are used in a number of scenarios. For example, in medical training, computational models of organs are useful to study different medical phenomena. For example, in modern applications, artificial intelligence (AI) systems can be used to identify such phenomena in scans from patients. To do this, the systems must learn what different phenomena look like so that they can be identified accurately. In many cases, this is achieved by inputting a number of training datasets into an AI system. The training datasets are models representing real patients that have already been studied by an expert in the field. This allows the AI system to know what it should find in the datasets, and therefore learn to identify features of interest present in other input datasets. This is known as machine learning.

To train the computational systems as thoroughly and robustly as possible, large training datasets are required. However, there are only a finite number of real patient models available and that number is usually not enough to robustly train an AI system. Therefore, the number of training datasets for machine learning applications is often augmented to increase the number of examples and hence increase stability of the trained models. In general, this is achieved by modifying existing datasets to generate new, different datasets. This modification is performed by rotating, scaling, translating and/or deforming the existing datasets. In cases where deformation is applied, existing models are deformed in a random, non-systematic manner.

Taking such an approach causes a number of issues as the generated datasets may not be realistic. In reality, body parts of different patients are not simple transformations of those of other patients. Random deformations do not accurately convey real inter-patient differences. Such unrealistic datasets can lead to erroneous training of AI systems which subsequently leads to poor performance of these systems when identifying features of interest present in other input datasets It is therefore an object of the present disclosure to build more realistic datasets representing body parts.

SUMMARY

In accordance with an aspect of the disclosure there is provided a method for generating data representing the volume of part of a body, the method comprising generating a point distribution model "PDM" based on an input dataset comprising data representing at least one surface of part of a body, the PDM defining a surface model dataset based on an average dataset and one or more weight-eigenvector pairs, generating a first surface model dataset based on the PDM by modifying at least one weight of the one or more weight-eigenvector pairs, wherein the first surface model dataset is different from the average dataset, and generating an output volume dataset based on the first surface model dataset and a first reference dataset, the first reference dataset comprising data representing the volume of a corresponding part of a body, the output volume dataset comprising data representing a deformed volume of the corresponding part of the body.

Optionally, the part of a body comprises at least one organ. Optionally, the body is a human body. Optionally, the input dataset is derived from at least one real body. Optionally, the input dataset comprises a plurality of datasets each representing the same part of a respective body.

Optionally, generating a first surface model dataset comprises modifying at least one weight of the one or more weight-eigenvector pairs such that the first surface model dataset generally corresponds to a second reference dataset, the method further comprising modifying at least one weight of the one or more weight-eigenvector pairs to provide a second surface model dataset different from the first surface model dataset, and determining a mapping between the first and second surface model datasets.

Optionally, the second reference dataset represents a corresponding part of a body and is derived from a real body. Optionally, determining the mapping comprises using a deformable image registration algorithm based on the first and second surface model datasets. Optionally, the deformable image registration algorithm produces only positive Jacobians. Optionally, generating the output volume dataset comprises applying the mapping to the first reference dataset.

Optionally, generating the PDM comprises using principal component analysis. Optionally, the average dataset is a mean average of the input dataset. Optionally, the one or more weight-eigenvector pairs comprises a plurality of weight-eigenvector pairs. Optionally, the plurality of weight-eigenvector pairs comprises a linear combination of the eigenvectors. Optionally, the PDM is defined by the equation $$x_m = x_a + \alpha_0 e_0 + \alpha_1 e_1 + \alpha_2 e_2 + \ldots + \alpha_n e_n$$

wherein $x_m$ is the surface model dataset, $x_a$ is the average dataset, $\alpha_x$ is a weight for the $x^{th}$ weight-eigenvector pair, $e_x$ is an eigenvector for the $x^{th}$ weight-eigenvector pair, and n is the number of weight-eigenvector pairs.

Optionally, modifying at least one weight of the one or more weight-eigenvector pairs comprises modifying the weight within an interval defined based on the standard deviation of the input dataset. Optionally, modifying at least one weight of the one or more weight-eigenvector pairs comprises modifying the weight randomly. Optionally, modifying at least one weight of the one or more weight-eigenvector pairs comprises modifying the weight incrementally from an initial weight. Optionally, modifying at least one weight of the one or more weight-eigenvector pairs comprises modifying all weights in the one or more weight-eigenvector pairs.

Optionally, the first reference dataset represents a corresponding part of a body and is derived from a real body. Optionally, the method further comprises using the output volume dataset as part of a training set for a deep learning process for an artificial intelligence system.

According to another aspect, there is provided a method for generating data representing the volume of part of a body, the method comprising generating a point distribution model "PDM" based on an input dataset comprising data representing at least one volume of part of a body, the PDM defining an output volume dataset based on an average dataset and one or more weight-eigenvector pairs, and generating an output volume dataset based on the PDM by modifying at least one weight of the one or more weight-eigenvector pairs, wherein the output volume dataset is different from the average dataset.

Optionally, the part of a body comprises at least one organ. Optionally, the body is a human body. Optionally, the input dataset is derived from at least one real body.

Optionally, the input dataset comprises a plurality of datasets each representing the same part of a respective body.

Optionally, generating the PDM comprises using principal component analysis. Optionally, the average dataset is a mean average of the input dataset. Optionally, the one or more weight-eigenvector pairs comprises a plurality of weight-eigenvector pairs. Optionally, the plurality of weight-eigenvector pairs comprises a linear combination of the eigenvectors. Optionally, the PDM is defined by the equation $$x_m = x_a + \alpha_0 e_0 + \alpha_1 e_1 + \alpha_2 e_2 + \ldots + \alpha_n e_n$$

wherein $x_m$ is the output volume dataset, $x_a$ is the average dataset, $\alpha_x$ is a weight for the $x^{th}$ weight-eigenvector pair, $e_x$ is an eigenvector for the $x^{th}$ weight-eigenvector pair, and n is the number of weight-eigenvector pairs.

Optionally, modifying at least one weight of the one or more weight-eigenvector pairs comprises modifying the weight within an interval defined by the standard deviation of the input dataset. Optionally, modifying at least one weight of the one or more weight-eigenvector pairs comprises modifying the weight randomly. Optionally, modifying at least one weight of the one or more weight-eigenvector pairs comprises modifying the weight incrementally from an initial weight. Optionally, modifying at least one weight of the one or more weight-eigenvector pairs comprises modifying all weights in the one or more weight-eigenvector pairs.

Optionally, the method further comprises using the output volume dataset as part of a training set for a deep learning process for an artificial intelligence system.

According to another aspect, there is provided a computer readable medium comprising instructions that, when run on a processor, cause the processor to perform the method.

BRIEF DESCRIPTION OF THE DRAWINGS

Exemplary embodiments of the disclosure shall now be described with reference to the drawings in which.

Throughout the description and the drawings, like reference numerals refer to like parts.

SPECIFIC DESCRIPTION

Figure 1:
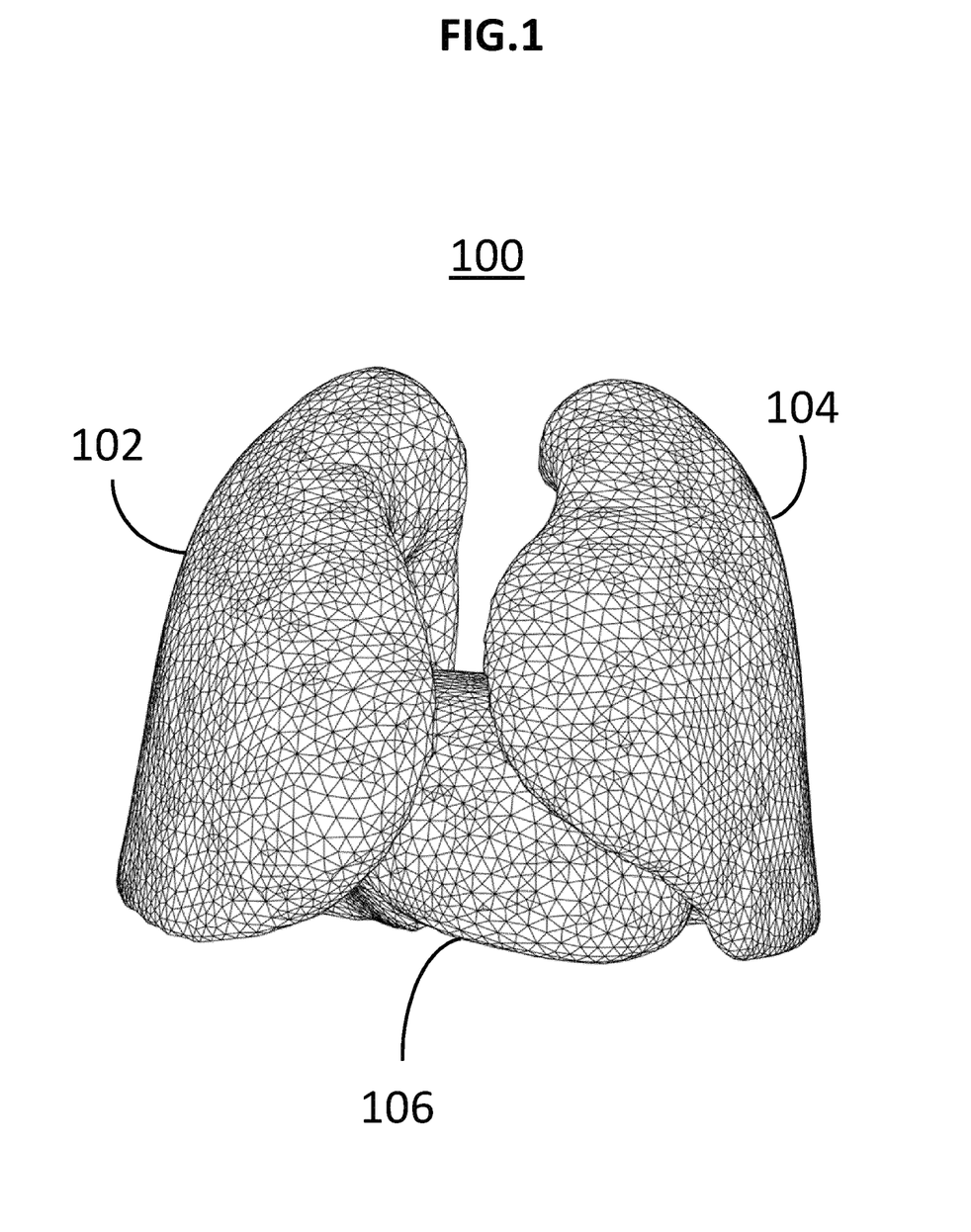
FIG. 1 shows a view of a computational model of a region of interest.

FIG. 1 shows a view of a computational model of a region of interest (ROI) 100. In this case, the ROI is of a human body and comprises a number of organs. As can be seen, the ROI 100 comprises two lungs 102, 104 and a heart 106. In other embodiments, an ROI may be of an animal body. In yet other embodiments, the ROI may comprise a different number of organs, for example a single organ, two organs or four or more organs.

The computational model may be derived from a scan of a patient. For example, a computed tomography (CT) scan, magnetic resonance imagery (MRI) scan or other type of scan known in the art could be used to capture the ROI 100 in the patient. The scan may then be segmented to delimit the different features in the ROI. For example, the segmentation process may delimit the first lung 102, the second lung 104 and the heart 106. The segmentation process may also identify internal features of the individual organs. The resulting computational model may include data representing the geometry of the ROI 100 in three dimensions, for example surface and volume coordinates of the organs 102-106.

The computational model is an example of a dataset that may be used in a training dataset for a machine learning process for an AI system, for example, for identification of physical features in a patient ROI. Such a training dataset should comprise as many different models as possible, such that the AI system can pick up as many different features as possible and therefore accurately identify such features in future input datasets. However, due to a variety of reasons, there is only a relatively small number of patient derived models for any given ROI.

The present disclosure presents a method of generating data representing an ROI that is different from existing datasets and is also realistic (human-like), rather than currently known artificial geometries which do not produce realistic geometries of ROIs.

The method comprises generating a point distribution model (PDM) for a particular ROI based on an input dataset. A point distribution model represents the average geometry of a shape and some statistical modes of geometric variation inferred from an input set of shapes. The input dataset comprises a plurality of datasets each representing the ROI for which the PDM is to be generated. In some embodiments, each dataset in the input dataset may be derived from a scan of a patient, as discussed above. In other embodiments, each dataset in the input dataset may be artificially derived. In yet other embodiments, the input dataset may comprise a combination of datasets derived from real patient scans and artificially derived datasets.

Each dataset in the input dataset comprises a plurality of data points such that the geometry of the original shape is sufficiently represented. A dataset x comprising m data points can be described in two dimensions as $x=(x_1, y_1, \ldots, x_m, y_m)$ and in three dimensions as $x=(x_1, y_1, z_1, \ldots, x_m, y_m, z_m)$. It is advantageous that each data point represents the same location in the ROI across all datasets in the input dataset, e.g., the first data point in each dataset represents the same part of the first lung 102. In some embodiments, the input dataset comprises sets of data points that describe a geometry in three dimensions. In some embodiments, this may be surface data representing the ROI, for example data points representing the surfaces of the lungs 102, 104 and heart 106 of ROI 100 in three dimensions. In some embodiments, the data sets may be volume data representing the ROI, for example data points representing the volumes of the organs 102-106 of ROI 100 in three dimensions. Using surface data only reduces the storage and processing requirements of the method and thus provides more efficient generation of a PDM. Using volume data provides more thorough and accurate modelling of ROIs and thus a more thorough and accurate PDM.

Principal component analysis (PCA) can be used to compute normalized eigenvectors and eigenvalues of the covariance matrix across the input dataset, where each eigenvector describes a principal mode of variation along the set. Finally, a linear combination of the eigenvectors is used to define a new shape/model dataset $x_m$, defined by the equation:

$$x_m = x_a + \alpha_0 e_0 + \alpha_1 e_1 + \alpha_2 e_2 + \ldots + \alpha_n e_n$$

where $x_m$ is the model dataset, $x_a$ is the average shape across the input dataset, $e_x$ is an eigenvector describing the $x^{th}$ mode of variation, $\alpha_x$ is a scaling value, or weight, for the $x^{th}$ eigenvector, and n+1 is the number of modes of variation.

In some embodiments, the average is the mean average. In some embodiments, there may be only a single mode of variation (i.e., n=0). In other embodiments, there is a plurality of modes of variation (i.e., n>0). In this case, $e_0$ represents the most common variation, with the subsequent eigenvectors representing less and less common variations until $e_n$, which represents the least common variation.

If all weights, $\alpha_n$, are set to zero, the produced model dataset, $x_m$, is the same as the average dataset, $x_a$. By modifying the values of $\alpha_0$ to $\alpha_n$, an infinite number of model datasets can be produced, each representing different shapes. As the PDM is based on an input dataset comprising real geometries, the variations that are captured are realistic and so the model datasets are also realistic.

Modifying any of the weights from zero will produce a model dataset, $x_m$, that is different from the average dataset. In some embodiments, a single weight is modified. In other embodiments, a subset of the plurality of weights are modified. In yet other embodiments, all weights $\alpha_0$ to $\alpha_n$ are modified. The weights may be modified within an interval to ensure that large deformations that would be unrealistic are not generated. The intervals may be defined based on the standard deviation of the input dataset around the mean surface. For example, each value of α may be limited to ±3 standard deviations. The standard deviation of a given principal component may be defined as the square root of its corresponding eigenvalue. In some embodiments, each weight is modified in a random manner. In other embodiments, each weight is modified systematically. For example, each weight is modified incrementally from an initial weight. For example, if an initial value of $\alpha_2$ is given as 0.34, the value of $\alpha_2$ can be modified incrementally, for example to 0.35, 0.36 and so on, to ensure that model dataset will change continuously starting from the first surface model dataset. Such modification could also be useful when modelling dynamic phenomena such as a breathing cycle.

By implementing different modifications of the weights in the PDM, different model datasets can be generated. As discussed above, as the PDM is based on an input dataset comprising real geometries, the variations that are captured are realistic and so the model datasets are also realistic. In embodiments where an ROI comprises a number of organs, such as ROI 100, the described method allows the organs to deform with each other in the model datasets, so one of the organs is not deformed unrealistically in relation to others (for example, producing two lungs of different sizes, which is rare in reality). Known methods of geometry generation cannot guarantee this.

In embodiments where the input dataset comprises volume data, the model datasets, $x_m$, generated from the PDM are deformed versions of the average volume in the PDM. In this case, each model dataset, $x_m$, generated from the PDM can be used in a training dataset for a machine learning process for an AI system. The machine learning process may be a deep learning process. The AI system may be an image segmentation algorithm. By increasing the training dataset, the machine learning process becomes more thorough and robust and the AI system more accurate. In this way, the AI system has an improved performance. In the example of an image segmentation algorithm, the algorithm may be able to more accurately segment images of ROIs that are input into the algorithm. In other implementations, the geometries could be used for adaptive scenarios where it is desired to predict future patient geometries. For example, an ROI for a given patient can look different at different times. This may be, for example, at different stages of the breathing cycle, where the lungs would have different shapes and sizes. Another example is that the geometry of an ROI may change at different stages of treatment, either if the treatment has worked or if it has side effects. The approach discussed above allows geometries to be generated that correspond to a desired outcome after a given stage of treatment, which can then be compared against a patient's real geometry to indicate success or otherwise of the treatment. The methods described herein allow generation of geometries for any application field where realistically deformed data is required.

Figure 2:
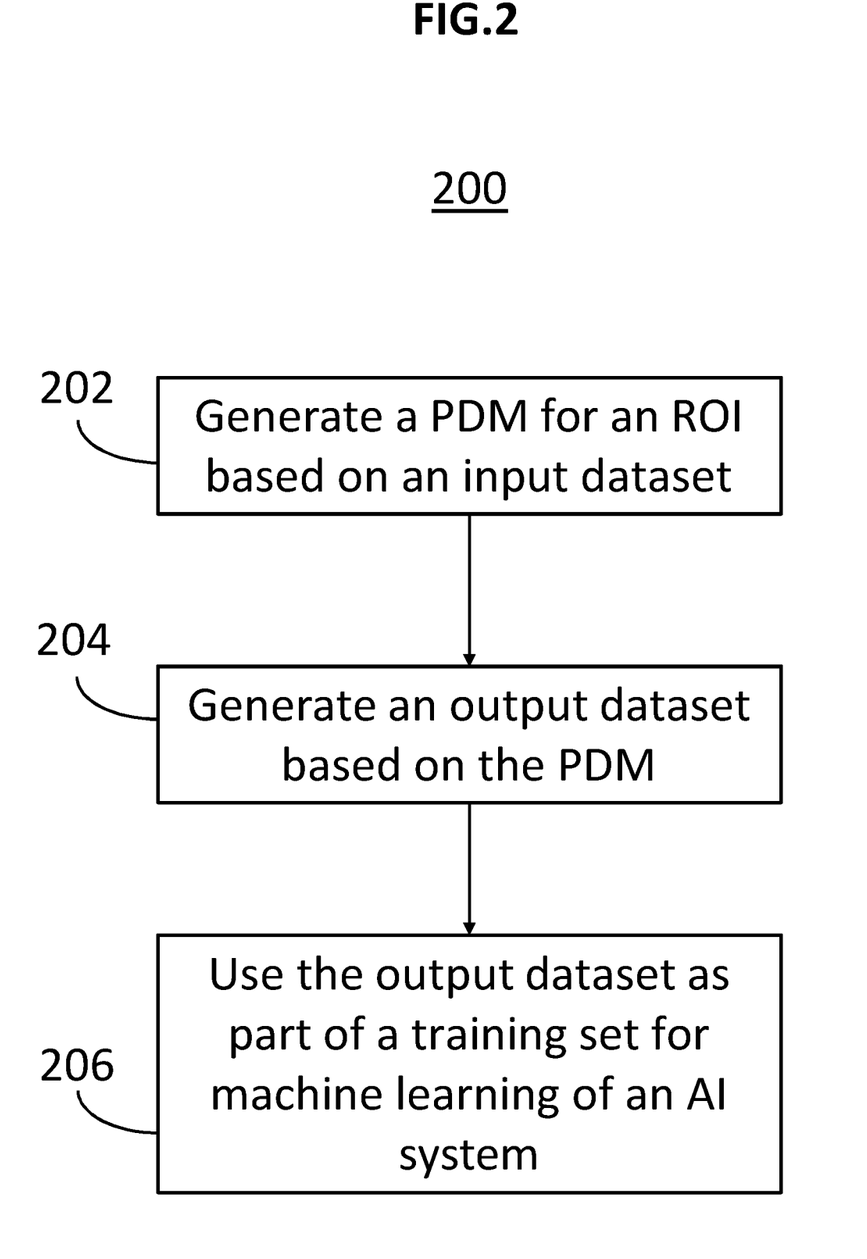
FIG. 2 shows a method for generating data representing the volume of part of a body according to the disclosure.

FIG. 2 shows a method 200 for generating data representing the volume of part of a body. As discussed above, the part of a body may be an ROI, such as ROI 100, comprising at least one organ, such as organs 102-106. In some embodiments, the body is a human body.

At step 202, a PDM for the ROI is generated based on an input dataset. The input dataset comprises data representing the volume of the ROI, and in some embodiments is derived from at least one real body, for example from a patient. The input dataset may comprise a plurality of datasets each representing the same ROI from different patients.

The PDM defines an output dataset based on an average dataset and one or more weight-eigenvector pairs. In some embodiments, the PDM is generated using principal component analysis, and comprises a mean average of the input dataset and a linear combination of eigenvectors.

At step 204, an output dataset is generated based on the PDM. The output dataset is generated by modifying at least one weight in the weight-eigenvector pairs, such that the output dataset is different from the average dataset. In some embodiments, the weights are modified within an interval defined by the standard deviation of the input dataset. The weights may be modified randomly or incrementally from an initial weight. One, some or all of the weights in the linear combination may be modified to produce the output dataset.

At step 206, the output dataset is used as part of a training set for machine learning of an AI system. For example, this may be deep learning for an image segmentation algorithm. Multiple output datasets can be generated such that the training set is as large as possible, which ensures that the AI system is robustly trained. This results in a system that has improved performance.

In some embodiments, model datasets generated from the PDM can be developed to produce further datasets at a relatively low computational cost. As will be discussed below, surface data only can be used at different stages to generate different volume datasets. By using surface data rather than volume data, the computational burden associated with computing eigenvectors is greatly reduced. To achieve this for a given model dataset, $x_m$, generated from the PDM, the model dataset is related to one or more reference datasets.

In some embodiments, the PDM is used to generate a first model dataset using the methods described above. In this case, the input dataset comprises only surface data representing the ROI and, as such, the model dataset that is generated from the PDM also comprises surface data representing the ROI for a new geometry. In some embodiments, the modification of the weights described above is performed such that the first model dataset generally corresponds to a reference dataset as closely as possible. The reference dataset is derived from a real body and represents a ROI corresponding to that of the input dataset and the PDM. In some embodiments, the reference dataset comprises surface data that represents a corresponding ROI, while in other embodiments the reference dataset comprises volume data that represents a corresponding ROI. Using surface data allows simpler modification of the PDM to match the reference ROI. The reason is that when the model dataset (which is a triangulated surface) is adapted to correspond to volume data, for example and image from a CT scan, it is necessary to extract different types of image features describing the edges between different parts of an ROI. This is called image segmentation and can be difficult for ROIs or parts of an ROI with a fuzzy border. By using surface data, the surfaces/ROIs/organs are already segmented from the image by an expert, for example a doctor, making it much easier to adapt the PDM to an already existing surface. Rotation, translation and scaling of the model dataset generated by the PDM can also be used to provide better correspondence to the reference dataset.

To ensure the correspondence is as accurate as necessary, a similarity measure may be applied. In some embodiments, a Dice similarity coefficient (DSC) is used. The DSC is a number between 0 and 1 that describes the geometric similarity between geometric objects. If the DSC is not high enough after a given number of iterations the adaptation is considered to have failed Once the first surface model dataset has been generated, the weights can be further modified to provide a second surface model dataset that is different from the first model dataset. The modification of the weights can be performed in any of the ways discussed above.

As such, two surface model datasets are generated. A geometric mapping between the first and second surface model datasets can then be determined. The mapping described the deformations that are required to change the first surface model dataset to the second surface model dataset. In some embodiments, the mapping is determined using a deformable image registration (DIR) algorithm based on the first and second model datasets. A DIR algorithm generates a three-dimensional deformation field or mapping. In this case, the generated mapping will map the first surface model dataset onto the second surface model dataset. If the first and second surface model datasets were identical, the mapping would have no effect. In some embodiments, the deformable image registration algorithm is configured such that it produces a mapping that is injective. That is to say, it does not map different points to the same point. A function that generates only positive Jacobians guarantees this. In this way, the mapping does not produce any folds in the generated surface. In most cases, a DIR is driven by minimizing some error measure between images based on pixel/voxel values. This is typically achieved using two different image scans, for example a pair of inhale/exhale images. Since these two images are different, one can be deformed onto the other. However, in embodiments disclosed here, only one image scan is used, and two surface models are used to drive the deformation. The image scan can then be deformed as a result of the mapping between the surfaces.

Once the mapping has been determined, an output dataset can be generated. To do this, the mapping is applied to a reference dataset. In this case, the reference dataset comprises volume data, such that the output of applying the mapping to the reference dataset is a dataset representing a deformed volume of the ROI in question. The reference dataset may be the same as that used to determine the first model dataset, or may be a different reference dataset. To ensure generation of a realistic output dataset, the reference dataset is derived from a real body and represents a ROI corresponding to that of the mapping. By relating the model datasets to real geometries at different stages, realistic deformations can be ensured. If for example, the PDM describing the ROI 100 is erroneously positioned over another part of a body, then the shape variations for the lungs 102, 104 and heart 106 of ROI 100 would be applied to a totally different anatomical region. By relating the PDM to real geometries of a corresponding ROI, this can be avoided.

Each output dataset generated using the mapping method can be used in a training dataset to provide a more thorough and robust machine learning process for an AI system, and as such a more accurate AI system. In the example of an image segmentation algorithm, the algorithm may be able to more accurately segment images of ROIs that are input into the algorithm. In other implementations, geometries generated from the PDM can be used for adaptive scenarios where it is desired to predict future patient geometries, or in any application field where realistically deformed data is required.

Figure 3:
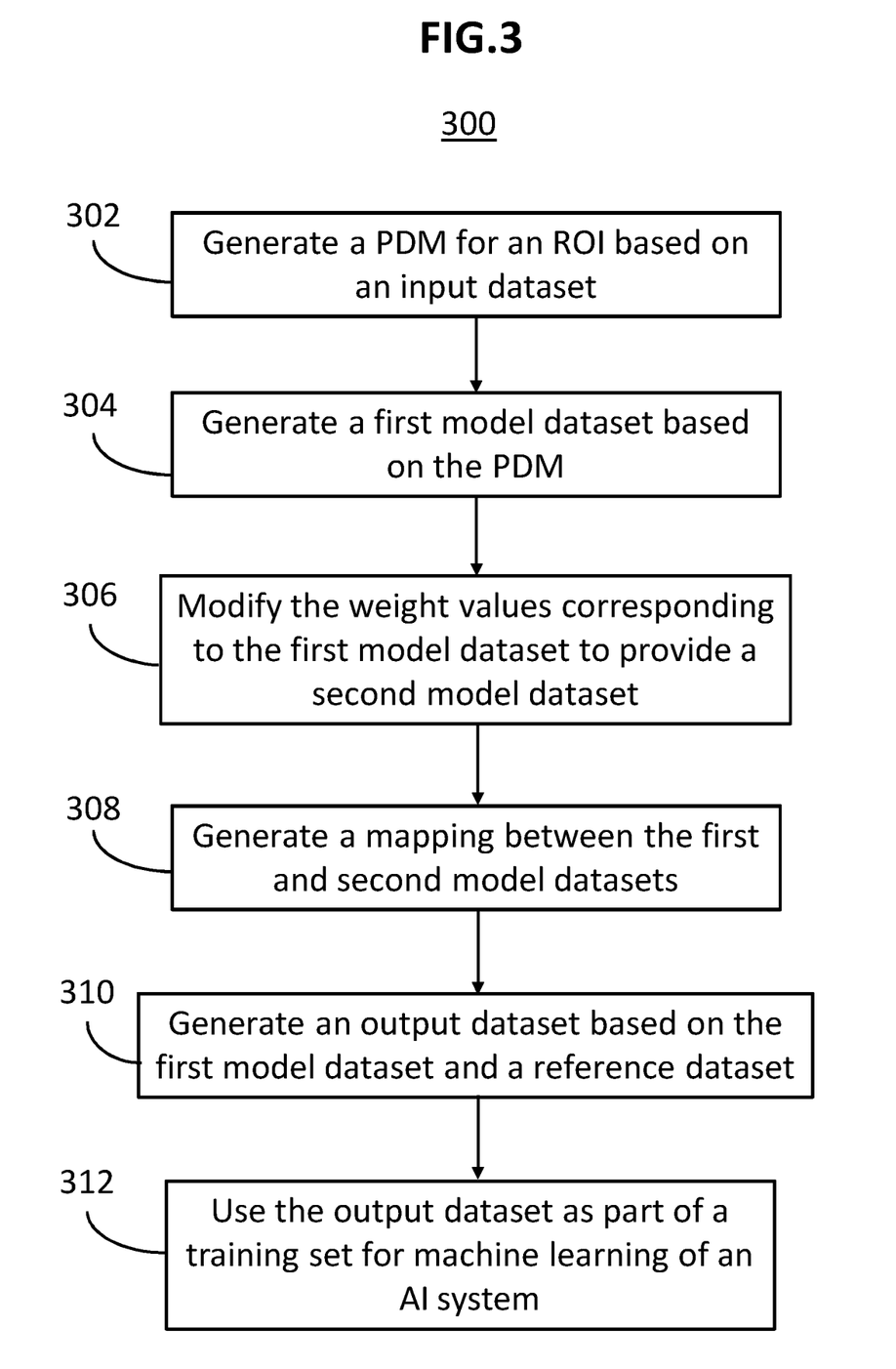
FIG. 3 shows another method for generating data representing the volume of part of a body according to the disclosure.

FIG. 3 shows a method 300 for generating data representing the volume of part of a body. Similarly to the method 200, the part of a body may be an ROI, such as ROI 100, comprising at least one organ, such as organs 102-106. In some embodiments, the body is a human body.

At step 302, a PDM for the ROI is generated based on an input dataset. The input dataset comprises data representing the surface or surfaces of the ROI, and in some embodiments is derived from at least one real body, for example from a patient. The input dataset may comprise a plurality of datasets each representing the same ROI from different patients. The PDM defines an output dataset based on an average dataset and one or more weight-eigenvector pairs. In some embodiments, the PDM is generated using principal component analysis, and comprises a mean average of the input dataset and a linear combination of eigenvectors.

At step 304, a first model dataset is generated based on the PDM. The output dataset is generated by modifying at least one weight in the weight-eigenvector pairs, such that the output dataset is different from the average dataset. This may comprise modifying the weights such that the first model dataset generally corresponds to a reference dataset. The reference dataset represents a corresponding ROI derived from a real body. In some embodiments, the weights are modified within an interval defined by the standard deviation of the input dataset. The weights may be modified randomly or incrementally from an initial weight. One, some or all of the weights in the linear combination may be modified to produce the first model dataset.

At step 306, the weight values corresponding to the first model dataset are modified to provide a second model dataset that is different from the first model dataset. In some embodiments, the weights are modified within an interval defined by the standard deviation of the input dataset. The weights may be modified randomly or incrementally from an initial weight. One, some or all of the weights in the linear combination may be modified to produce the second model dataset.

At step 308, a mapping between the first and second model datasets is generated. In some embodiments, the mapping is generated using a deformable image registration algorithm based on the first and second model datasets. In some embodiments, the deformable image registration algorithm is configured such that it produces a mapping that is injective. That is to say, the deformable image registration algorithm produces only positive Jacobians.

At step 310, an output dataset is generated based on the first model dataset and a reference dataset. Specifically, the mapping, which is determined based on the first model dataset, is applied to the reference dataset. The reference dataset represents the volume of a corresponding ROI derived from a real body. As such, the output dataset comprises data representing a deformed volume of the ROI in question.

At step 312, the output dataset is used as part of a training set for machine learning of an AI system. For example, this may be deep learning for an image segmentation algorithm. Multiple output datasets can be generated such that the training set is as large as possible, which ensures that the AI system is robustly trained. This results in a system that has improved performance.

The methods described above mitigate issues with training AI systems for human or animal ROIs. The disclosed methods allow generation of multiple geometries that can be used to augment training sets for AI systems, where currently only a finite number of real patient models are available, and that number is usually not enough to robustly train an AI system. Further, where currently generated datasets may not be realistic, due to random or unnatural deformations, the disclosed methods allow generation of synthetic but human-like geometries. By generation of such realistic geometries, and thus augmenting training sets for AI systems, the training can be performed more thoroughly and robustly. As such, the performance of the trained AI systems is improved. In the example of an image segmentation algorithm, the algorithm may be able to more accurately segment images of ROIs that are input into the algorithm. In other implementations, geometries generated from the PDM can be used for adaptive scenarios where it is desired to predict future patient geometries, or in any application field where realistically deformed data is required.

Figure 4:
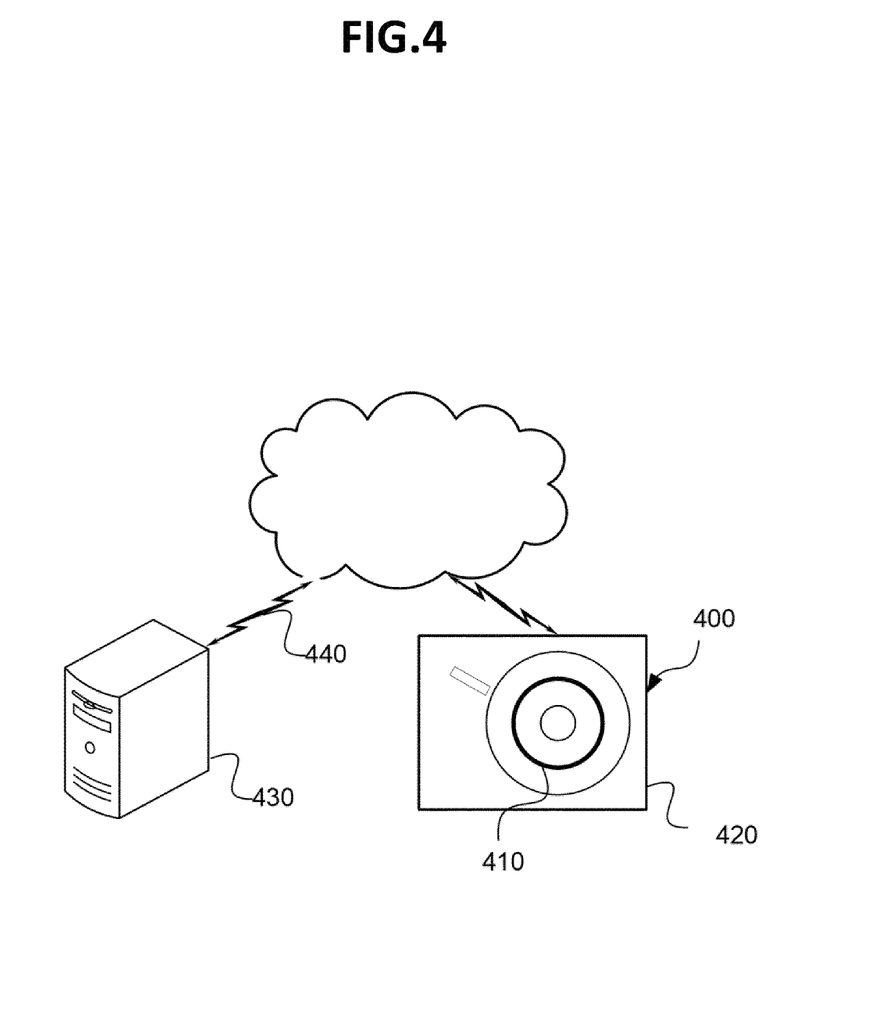
FIG. 4 shows a schematic view of a computing environment.

FIG. 4 shows a schematic view of a computer-readable medium 400 encoded with instructions 410 that, when executed on a processor, performs the methods described above. The computer-readable medium 400 is in this embodiment a data disc. In one embodiment the data disc may be a magnetic data storage disc. The data disc may be configured to carry instructions 410 that when loaded into a controller, such as a processor, executes a method or procedure according to the embodiments disclosed above. The data disc may be arranged to be connected to or within and read by a reading device 420, for loading the instructions into a controller. One such example of a reading device 420 in combination with one (or several) data disc(s) is a hard drive. It should be noted that the computer-readable medium can also be other mediums such as compact discs, digital video discs, flash memories or other memory technologies commonly used. In such an embodiment the data disc may be one type of a tangible computer-readable medium 400.

The instructions 410 may also be downloaded to a computer data reading device 430, such as a computer or other device capable of reading computer coded data on a computer-readable medium, by comprising the instructions 410 in a computer-readable signal 440 which is transmitted via a wireless (or wired) interface (for example via the Internet) to the computer data reading device 430 for loading the instructions 410 into a controller. In such an embodiment the computer-readable signal 440 is one type of a non-tangible computer-readable medium 400.

The controller is responsible for the overall operation of the computer data reading device 430 and is preferably implemented by any commercially available CPU ("Central Processing Unit"), DSP ("Digital Signal Processor") or any other electronic programmable logic device. The controller may be implemented using instructions that enable hardware functionality, for example, by using executable computer program instructions in a general-purpose or special-purpose processor that may be stored on a computer readable storage medium (disk, memory etc.) to be executed by such a processor. The controller may be configured to read instructions from the memory and execute these instructions to control the operation of the computer data reading device 430. The memory may be implemented using any commonly known technology for computer-readable memories such as ROM, RAM, SRAM, DRAM, CMOS, FLASH, DDR, EEPROM memory, flash memory, hard drive, optical storage or any combination thereof.

The computer data reading device 430 may according to some embodiments further comprise a user interface, which may, for example, comprise a display and a keypad or a touch screen. Other user interface elements known in the art may equally for part of the user interface.

References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

Modifications and other variants of the described embodiments will come to mind to one skilled in the art having benefit of the teachings presented in the foregoing description and associated drawings. Therefore, it is to be understood that the embodiments are not limited to the specific example embodiments described in this disclosure and that modifications and other variants are intended to be included within the scope of this disclosure. Furthermore, although specific terms may be employed herein, they are used in a generic and descriptive sense only and not for purposes of limitation. Therefore, a person skilled in the art would recognize numerous variations to the described embodiments that would still fall within the scope of the appended claims. As used herein, the terms "comprise/comprises" or "include/includes" do not exclude the presence of other elements or steps. Furthermore, although individual features may be included in different claims, these may possibly advantageously be combined, and the inclusion of different claims does not imply that a combination of features is not feasible and/or advantageous. In addition, singular references do not exclude a plurality.

The invention claimed is:

1. A method for generating data representing the volume of part of a body, the method comprising:
   generating a point distribution model "PDM" based on an input dataset comprising data representing at least one surface of part of a body, the PDM defining a surface model dataset for the part of the body based on an average dataset and one or more weight-eigenvector pairs;
   generating a first surface model dataset based on the PDM by modifying at least one weight of the one or more weight-eigenvector pairs such that the first surface model dataset corresponds to a first reference dataset, wherein the first surface model dataset is different from the average dataset;

modifying at least one weight of the one or more weight-eigenvector pairs to provide a second surface model dataset different from the first surface model dataset;

determining a mapping between the first surface model dataset and the second surface model dataset; and generating an output volume dataset for the part of the body by applying the mapping to a second reference dataset, the second reference dataset comprising volume data representing the volume of a corresponding part of a body, the output volume dataset comprising data representing a deformed volume of the corresponding part of the body, wherein the first reference dataset is the same as the second reference dataset or is different from the second reference dataset.

2. The method of claim 1, wherein the input dataset is derived from at least one real body, and/or comprises a plurality of datasets each representing the same part of a respective body.

3. The method of claim 1, wherein the first reference dataset represents a corresponding part of a body and is derived from a real body.

4. The method of claim 1, wherein determining the mapping comprises using a deformable image registration algorithm based on the first and second surface model datasets, and wherein the deformable image registration algorithm optionally produces only positive Jacobians.

5. The method of claim 1, wherein modifying at least one weight of the one or more weight-eigenvector pairs comprises modifying the weight within an interval defined based on the standard deviation of the input dataset.

6. The method of claim 1, wherein modifying at least one weight of the one or more weight-eigenvector pairs comprises modifying the weight randomly or modifying the weight incrementally from an initial weight.

7. The method of claim 1, wherein modifying at least one weight of the one or more weight-eigenvector pairs comprises modifying all weights in the one or more weight-eigenvector pairs.

8. The method of claim 1, wherein the second reference dataset represents a corresponding part of a body and is derived from a real body.

9. The method of claim 1, further comprising using the output volume dataset as part of a training set for a deep learning process for an artificial intelligence system.

10. A non-transitory computer readable medium comprising instructions that, when run on a processor, cause the processor to perform the method of claim 1.

11. A system for generating data representing the volume of part of a body, the system comprising:

a memory that stores instructions; and a processor the runs the instructions causing the processor to perform the method comprising:

generating a point distribution model "PDM" based on an input volume dataset comprising data representing at least one volume of part of a body, the PDM defining a surface model dataset for the part of the body on an average dataset and one or more weight-eigenvector pairs;

generating a first surface model dataset based on the PDM by modifying at least one weight of the one or more weight-eigenvector pairs such that the first surface model dataset corresponds to a first reference dataset, wherein the first surface model dataset is different from the average dataset;

modifying at least one weight of the one or more weight-eigenvector pairs to provide a second surface model dataset different from the first surface model dataset;

determining a mapping between the first surface model dataset and the second surface model dataset; and generating an output volume dataset for the part of the body by applying the mapping to a second reference dataset, the second reference dataset comprising volume data representing the volume of a corresponding part of a body, the output volume dataset comprising data representing a deformed volume of the corresponding part of the body, wherein the first reference dataset is the same as the second reference dataset or is different from the second reference dataset.

12. The system of claim 11, wherein the input dataset is derived from at least one real body, and/or comprises a plurality of datasets each representing the same part of a respective body.

13. The system of claim 11, wherein modifying at least one weight of the one or more weight-eigenvector pairs comprises modifying the weight within an interval defined by the standard deviation of the input dataset.

14. The system of claim 11, wherein modifying at least one weight of the one or more weight-eigenvector pairs comprises modifying the weight randomly or modifying the weight incrementally from an initial weight.

15. The system of claim 11, wherein modifying at least one weight of the one or more weight-eigenvector pairs comprises modifying all weights in the one or more weight-eigenvector pairs.

16. The system of claim 11, further comprising using the output volume dataset as part of a training set for a deep learning process for an artificial intelligence system.

* * * * *